Oct. 19, 1965  K. RUOFF ETAL  3,212,611
DOUBLE CLUTCH CONSTRUCTION
Filed Aug. 27, 1963
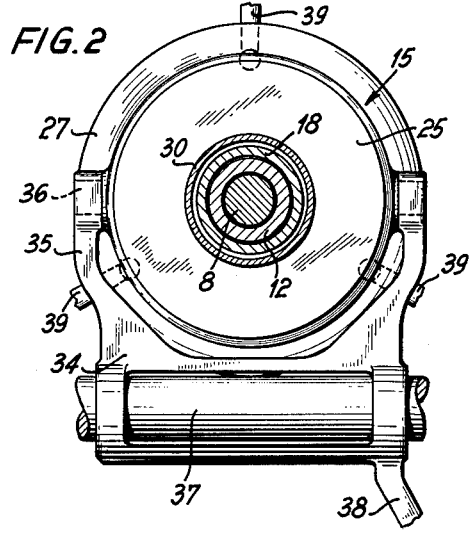
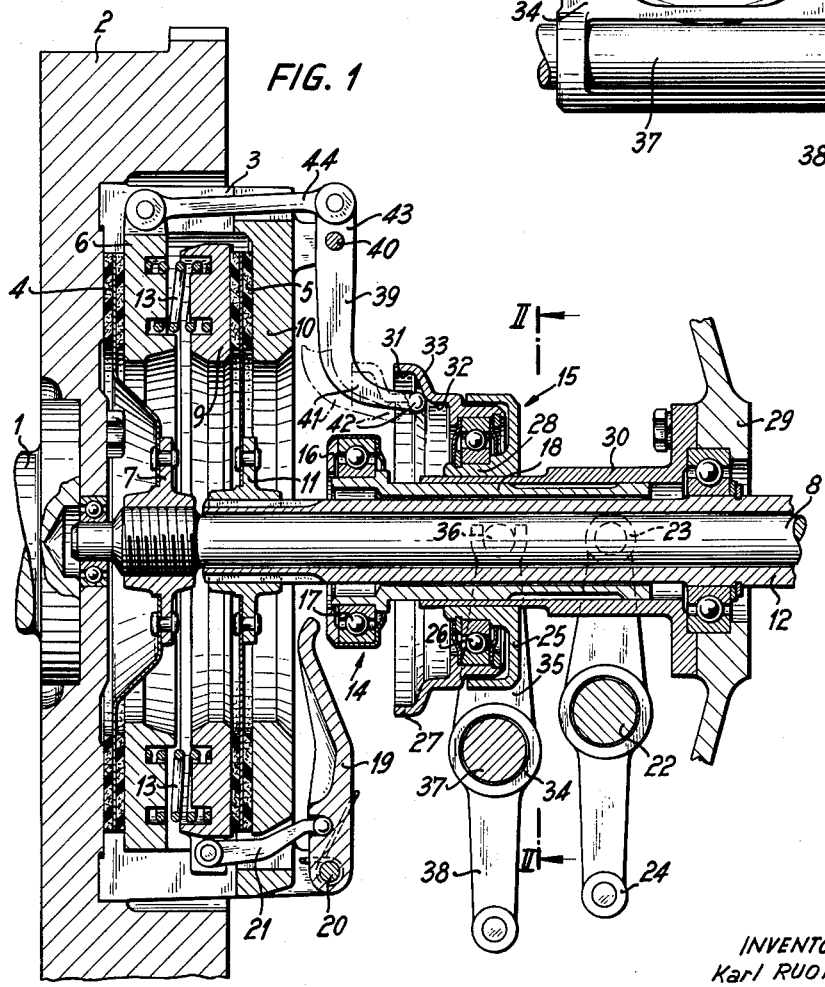
INVENTORS
Karl RUOFF
Walter EBERLE
BY Dicke & Craig
ATTORNEYS 3,212,611
DOUBLE CLUTCH CONSTRUCTION
Karl Ruoff, Kirchheim, Teck, and Walter Eberle, Goppingen, Germany, assignors to Dr. Ing. h.c.F. Porsche K.G., Stuttgart-Zuffenhausen, Germany
Filed Aug. 27, 1963, Ser. No. 304,863
Claims priority, application Germany, Sept. 14, 1962, P 30,177
9 Claims. (Cl. 192—48)

The present invention relates to a double clutch, especially for agricultural tractors provided with two clutch friction disks arranged axially symmetrical to each other, of which one friction disk is operatively connected with the transmission input shaft and the other with an auxiliary drive shaft, and which friction disks are actuated against the effect of common pressure springs by means of disengaging levers distributed over the circumference by way of disengaging bearings including roller bearings which are displaceably supported independently of one another relative to the clutch disks.

With the known prior art constructions of this type the engagement and disengagement of the clutches disposed one behind the other takes place as a rule by a common disengaging bearing against the effect of springs which oppose a larger resistance to the actuating lever after the unclutching or disengagement of the first clutch. The proper adjustment of such double clutches is particularly difficult to realize in practice by reason of the different lining friction between the clutch disk of the vehicle drive and the clutch disk of the auxiliary drive, and presupposes for purposes of correct adjustment very great expert skill and knowledge. In order to avoid these difficulties, double clutches are used already with agricultural tractors of which the clutch disks are adapted to be actuated independently of one another by two coaxially arranged disengaging bearings. With these prior art constructions a further clutch, for example a claw clutch or lamellae clutch is necessary in the shaft connection of the auxiliary drive, for instance, of the take-off shaft in order to enable the selective operation of an attached working implement. In order to reduce the costs that are involved in connection therewith, it has already been proposed heretofore to insert between the disengaging bearings and the clutch disk self-locking knee levers or the like which hold the clutch disk in the engaged or disengaged position thereof. As a result thereof the second clutch may be dispensed with and thus savings realized, however, with a disengaged clutch high axial loads have to be accepted at the disengaging bearing which lead to a premature wear thereof.

The aim of the present invention, in contradistinction thereto, essentially consists of reducing the costs by eliminating the second clutch in the shaft connection of the auxiliary drive and to assure simultaneously therewith a long length of life of the disengaging bearing by relieving the disengaging bearing with disengaged clutch disk of the pressure of the clutch springs. This is achieved in accordance with the present invention in that the disengaging bearing coordinated to the clutch disk of the auxiliary drive includes a disengaging dish-shaped element held by the outer ring or race of the roller bearing and provided with a conical pressure surface for the disengaging levers and a cylindrical centering surface against which the disengaging levers come to lie after the lifting or initial disengagement of the clutch disk. A considerable simplification of the auxiliary drive results therefrom, whereby the occurring wear at the disengaging bearing is kept relatively small. The conical pressure surface of the disengaging dish-shaped element is arranged advantageously between two cylindrical annular surfaces of which the one serves as centering surface and the other as end abutment for the disengaging levers. The end abutment prevents the clutch pressure plate from coming into abutment against the lamellae of the clutch disk when the maximum permissive friction is attained at the clutch disk. A favorable construction of the disengaging bearing is achieved in that the disengaging dish-shaped element is surrounded over a part of its circumference by the disengaging housing displaceably held on a centering sleeve and the inner hub portion of the housing carries the inner ring or race of the roller bearing. The centering sleeve serves simultaneously for the guidance and holding of an adjusting shaft which carries the disengaging bearing of the clutch disk of the transmission input shaft. The disengaging levers are formed advantageously by double-armed bell cranks, whereby the angularly bent arm is kept in contact with the disengaging dish-shaped element whereas the other arm is pivotally connected by way of a pull rod with the pressure plate of the clutch disk. A space-saving arrangement is obtained thereby in which both disengaging bearings lie close to one another.

Accordingly, it is an object of the present invention to provide a double clutch, particularly for agricultural tractors which is simple in construction, reliable in operation and effectively eliminates the shortcomings and drawbacks encountered with the prior art constructions as mentioned hereinabove.

A further object of the present invention resides in the provision of a double clutch construction, particularly for agricultural tractors in which the disengaging bearings are far-reachingly relieved of wear thereby increasing the length of life of the clutch.

A still further object of the present invention resides in the provision of a double clutch of the type mentioned hereinabove which is simple to adjust for proper operation thereof without requiring expert skill.

Another object of the present invention resides in the provision of a double clutch construction for agricultural tractors of which one clutch serves as disengaging clutch for the drive of the tractor and the other for the selective operation of an auxiliary drive, which obviates the need for further clutches to enable mutually independent selective operation of the clutches, minimizes axial loads on the disengaging bearings and assures a longer life, particularly insofar as the disengaging bearings are connected.

A still further object of the present invention resides in the provision of a double clutch construction which permits a compact arrangement of the double clutch, allows a greatly simplified construction and also enables reduction of the costs, particularly in the auxiliary drive construction.

These and other objects, features and advantages of the present invention will become more obvious from the following description when taken in connection with the accompanying drawing which shows, for purposes of illustration only, one embodiment in accordance with the present invention, and wherein:

FIGURE 1 is a center longitudinal cross-sectional view through a double clutch for an agricultural tractor with the surrounding parts of the internal combustion engines and the disengaging bearing for the auxiliary drive in accordance with the present invention, and FIGURE 2 is a cross-sectional view taken along line II—II of FIGURE 1.

Referring now to the drawing wherein like reference numerals are used throughout the various views to designate like parts, and more particularly to FIGURE 1, reference numeral 1 designates therein the crank shaft of an internal combustion engine (not shown) which is operatively connected with the fly-wheel 2. A multi-partite clutch housing 3 for axially similar clutch friction disks 4 and 5 arranged one behind the other is secured at the fly-wheel 2. The clutch disk 4 is arranged between the fly-wheel 2 and a pressure plate 6 guided within the housing 3 and is connected by means of the hub portion 7 thereof for common rotation with an auxiliary drive shaft 8 driving the take-off shaft of the tractor (not shown). The clutch disk 5 which is retained between a pressure plate 9 also guided within the housing 3 and a flange 10 of the housing 3, is operatively connected by way of the hub portion 11 thereof for common rotation with the transmission input shaft 12 constructed as hollow shaft. Pressure springs 13 uniformly distributed over the circumference are arranged between the pressure plates 6 and 9 which springs hold the clutch disks 4 and 5 in frictional engagement. Disengaging bearings generally designated by reference numerals 14 and 15 which are arranged coaxially with respect to each other are provided for the actuation of the clutch disks 4 and 5.

The disengaging bearing 14 for the clutch disk 5 of the vehicle drive consists essentially of an abutment ring 16 and of a roller bearing 17 which is supported on an adjusting shaft 18 displaceably surrounding the transmission input shaft 12. Three disengaging levers 19 distributed over the circumference cooperate with the abutment ring 16 which are each pivotally secured at the cluch housing 3 about a respective bolt 20. The disengaging levers 19 are operatively connected by way of pivoted support rods 21 with the clutch pressure plate 9 of the clutch disk 5. A doubled-armed lever 23 pivotally supported about a shaft 22 serves for the actuation of the adjusting shaft 18 retaining the disengaging bearing 14 whereby the arm 24 of the double-armed lever 23 is pivotally connected by way of a linkage (not illustrated) with the clutch pedal of the tractor.

The disengaging bearing 15 includes a roller bearing 26 held in a housing 25 and a dish-shaped disengaging element 27 which is surrounded over a part of its circumference by the housing 25. The hub portion 28 of the housing 25 is displaceably held on a centering sleeve 30 secured at a change-speed transmission housing 29. The centering sleeve 30 serves simultaneously for the guidance and support of the adjusting shaft 18 of the disengaging bearing 14. The dish-shaped disengaging member 27 is rotatably connected with the outer ring or race of the roller bearing 26 and includes two cylindrical annular surfaces 31 and 32 between which is arranged a conical pressure surface 33. For purposes of actuation of the disengaging bearing 15 there is provided a disengaging fork 34 (FIGURE 2) of which the fork arms 35 are in engagement with bolts 36 arranged at the disengaging housing 25. The disengaging fork 34 is pivotally held about a shaft 37 and is actuated by a manual lever (not illustrated) of any suitable construction which engages the arm 38 of the fork 34. For purposes of transmitting the disengaging movement from the bearing 15 to the pressure plate 6, three disengaging levers 39 are also provided which are arranged offset with respect to the disengaging levers 19. Each of the disengaging levers 39 is constructed as double-armed bell crank and is pivotally secured at the clutch housing about a respective bolt 40. The angularly bent arm 41 of the disengaging lever 39 is provided with a round head portion 42 which abuts against the conical pressure surface 33 with an engaged clutch. A pull rod 44 is pivotally connected, on the one hand, to the arm 43 of the disengaging lever 39 and is also operatively connected, on the other, with the pressure plate 6 of the clutch disk 4.

In the position illustrated in FIGURE 1 both clutches 4 and 5 are engaged so that both the transmission input shaft 12 as well as the auxiliary drive shaft 8 rotate at the speed of the engine. If the take-off shaft is no longer needed, then the pressure plate 6 has to be disengaged from the clutch disk 4. For that purpose, the fork arms 35 of the disengaging fork 34 are pressed by the manual lever (not shown) in the direction toward the crank shaft 1 whereby the disengaging bearing 15 slides toward the left on the centering sleeve 30 as viewed in FIGURE 1 of the drawing. As a result of this movement, the arm 41 of the disengaging lever 39 is pressed inwardly by the conical pressure surface 33 of the dish-shaped disengaging member 27 so that the arm 43 thereof moves toward the right and therewith lifts-off by way of the pull rod 44 the pressure plate from the clutch disk 4 against the force of the springs. During this operation the roller bearing 26 is loaded axially by the back effect of the force of the springs 13. If the disengaging bearing 15 is now further displaced in the axial direction, then the head portion 42 of the disengaging lever 39 slides off the pressure surface 33 and comes to lie against the centering surface 32 in the end position thereof as shown in the drawing in dash and dot lines, whereby the bearing 26 is relieved from the pressure of the springs 13. The engagement of the clutch takes place analogously in a reverse sequence.

While we have shown and described one embodiment in accordance with the present invention, it is understood that the same is not limited thereto, but is susceptible of numerous changes and modifications as known to a person skilled in the art. Thus, for example, the present invention is suitable also for double clutches in which the clutch disk of the auxiliary drive is disposed to the rear of the clutch disk for the vehicle drive. Consequently, since it is obvious that the present invention is susceptible of numerous changes and modifications as known to a person skilled in the art, we do not wish to be limited to the details shown and described herein but intend to cover all such changes and modifications as are encompassed by the scope of the appended claims.

We claim:

1. A double clutch structure for agricultural tractors, comprising:
    two clutch friction disk means arranged axially similarly with respect to each other, one of said friction disk means being adapted to be connected with the transmission input shaft and the other with an auxiliary drive shaft,
    common pressure spring means normally holding said friction disk means in engagement,
    disengaging means for disengaging the disk means including circumferentially distributed disengaging lever means and disengaging bearing means having roller bearing means operable to engage with said lever means, said disengaging bearing means being displaceably supported independently of one another relative to said clutch disk means,
    the disengaging bearing means coordinated to said other clutch disk means including an outer ring and substantially dish-shaped means held by said outer ring and provided with conical pressure surface means for the corresponding disengaging lever means and with a substantially cylindrically shaped centering surface means against which said disengaging lever means come to lie after the lifting of said other clutch disk means, said substantially cylindrically shaped centering surface means being adjacent said outer ring.

2. A double clutch structure for agricultural tractors, comprising:
    two clutch friction disk means arranged axially similarly with respect to each other, one of said friction disk means being adapted to be connected with the transmission input shaft and the other with an auxiliary drive shaft, common pressure spring means normally holding said friction disk means in engagement, disengaging means for disengaging the disk means including circumferentially distributed disengaging lever means and disengaging bearing means having roller bearing means operable to engage with said lever means, said disengaging bearing means being displaceably supported independently of one another relative to said clutch disk means, the disengaging bearing means coordinated to said other clutch disk means including an outer ring and an inner ring and substantially dish-shaped means held by said outer ring and provided with conical pressure surface means for the corresponding disengaging lever means and with a substantially cylindrically shaped centering surface means having a lesser radial extent than said conical pressure surface means and against which said disengaging lever means come to lie after the lifting of said other clutch disk means, a centering sleeve, said last-mentioned disengaging bearing means including a housing displaceably supported on said centering sleeve, said dish-shaped means being surrounded over a portion of the circumference thereof by said housing, and said housing being provided with a hub portion supporting the inner ring of said last-mentioned disengaging bearing means.

3. A double clutch structure for agricultural tractors, comprising:

two clutch friction disk means arranged axially similarly with respect to each other, one of said friction disk means being adapted to be connected with the transmission input shaft and the other with an auxiliary drive shaft, common pressure spring means normally holding said friction disk means in engagement, disengaging means for disengaging the disk means including circumferentially distributed disengaging lever means and disengaging bearing means having roller bearing means operable to engage with said lever means, said disengaging bearing means being displaceably supported independently of one another relative to said clutch disk means, the disengaging bearing means coordinated to said other clutch disk means including an outer ring and an inner ring and substantially dish-shaped means held by said outer ring and provided with conical pressure surface means for the corresponding disengaging lever means and with a substantially cylindrical shaped centering surface means against which said disengaging lever means come to lie after the lifting of said other clutch disk means, a centering sleeve, said last-mentioned disengaging bearing means including a housing displaceably supported on said centering sleeve, said dish-shaped means being surrounded over a portion of the circumference thereof by said housing, and said housing being provided with a hub portion supporting the inner ring of said last-mentioned disengaging bearing means, an adjusting shaft, said centering sleeve serving for the guidance and support of said adjusting shaft and said adjusting shaft supporting thereon the disengaging bearing means of the clutch disk means associated with the transmission input shaft.

4. A double clutch structure for agricultural tractors, comprising:

two clutch friction disk means provided with pressure plate means and arranged axially similarly with respect to each other, one of said friction disk means being adapted to be connected with the transmission input shaft and the other with an auxiliary drive shaft, common pressure spring means normally holding said friction disk means in engagement, disengaging means for disengaging the disk means including circumferentially distributed disengaging lever means and disengaging bearing means having roller bearing means operable to engage with said lever means, said disengaging bearing means being displaceably supported independently of one another relative to said clutch disk means, the disengaging bearing means coordinated to said other clutch disk means including an outer ring and substantially dish-shaped means held by said outer ring and provided with conical pressure surface means for the corresponding disengaging lever means and with a substantially cylindrically shaped centering surface means against which said disengaging lever means come to lie after the lifting of said other clutch disk means, said disengaging lever means being formed by double-armed bell-cranks, one of the angularly bent arms of each of a plurality of said bell-crank being in contact with said dish-shaped means, and connecting means including a pull-rod pivotally connecting the other arm of said each of said plurality of said bell-cranks with the pressure plate means of said other clutch disk means.

5. A double clutch structure for agricultural tractors, comprising:

two clutch disk means, one of said clutch disk means being adapted to be connected with a first shaft and the other with a second shaft, common pressure spring means normally holding said clutch disk means in engagement, disengaging means for disengaging the clutch disk means including disengaging lever means and disengaging bearing means operable to engage wtih said lever means, said disengaging bearing means being displaceably supported independently of one another relative to said clutch disk means, the disengaging bearing means coordinated to said other clutch disk means including outer ring means and substantially dish-shaped means held by said outer ring means and provided with approximately conical pressure surface means for the corresponding disengaging lever means and with annular surface means against said disengaging lever means come to lie after lifting of said other clutch disk means upon axial movement of said last-named disengaging bearing means in the direction of said other clutch means.

6. A double clutch structure for agricultural tractors, comprising:

two clutch friction disk means provided with pressure plate means and arranged axially similarly with respect to each other, one of said friction disk means being adapted to be connected with the transmission input shaft and the other with an auxiliary drive shaft, common pressure spring means normally holding said friction disk means in engagement, disengaging means for disengaging the disk means including circumferentially distributed disengaging lever means and disengaging bearing means having roller bearing means operable to engage wtih said lever means, said disengaging bearing means being displaceably supported independently of one another relative to said clutch disk means, the disengaging bearing means coordinated to said other clutch disk means including an outer ring and an inner ring and substantially dish-shaped means held by said outer ring and provided with conical pressure surface means for the corresponding disengaging lever means and with a substantially cylindrically shaped annular centering surface means against which said disengaging lever means come to lie after the lifting of said other clutch disk means, said dish-shaped means being provided with a further substantially cylindrically shaped annular surface means, and said conical pressure surface means being arranged between said two substantially cylindrically shaped annular surface means, first-named and said further annular surface means serving as centering surface and said further annular surface means as end abutment for said last-mentioned disengaging lever means, said first-named annular surface means having a diameter less than said further annular surface means, a centering sleeve, said last-mentioned disengaging bearing means including a housing displaceably supported on said centering sleeve, said dish-shaped means being surrounded over a portion of the circumference thereof by said housing, and said housing being provided with a hub portion supporting the inner ring of said last-mentioned disengaging bearing means, said disengaging lever means being formed by double-armed bell-cranks, one of the angularly bent arms of each of a plurality of said bell-cranks being in contact with said dish-shaped means, and connecting means including a pull-rod pivotally connecting the other arm of said each of said plurality of said bell-cranks with the pressure plate means of said other clutch disk means.

7. A double clutch structure for agricultural tractors, comprising:

two clutch disk means, one of said clutch disk means being adapted to be connected with a first shaft and the other with a second shaft, common pressure spring means normally holding said clutch disk means in engagement, disengaging means for disengaging the clutch disk means including disengaging lever means and disengaging bearing means operable to engage with said lever means, said disengaging bearing means being displaceably supported independently of one another relative to said clutch disk means, the disengaging bearing means coordinated to said other clutch disk means including ring means and substantially dish-shaped means held by said ring means and provided with approximately conical pressure surface means for the corresponding disengaging lever means and with annular surface means against which said disengaging lever means come to lie after lifting of said other clutch disk means, said dish-shaped means being also provided with a further annular surface means, said conical pressure surface means being arranged between said first-named and said further annular surface means, said first named annular surface means serving as centering surface and said further annular surface means as abutment surfaces for said disengaging lever means of said other clutch disk means, sleeve means, said last-mentioned disengaging bearing means including housing means displaceably supported on said sleeve means, said dish-shaped means being surrounded over a portion of the circumference thereof by said housing means and said housing means being provided with a hub portion supporting some of the ring means of said disengaging bearing means, further shaft means, said sleeve means serving for the guidance and support of said further shaft means and said further shaft means supporting thereon the disengaging bearing means of the clutch disk means associated with the second shaft, said disengaging lever means comprising a plurality of double-armed levers each having angularly bent arms, one of said angularly bent arms of each of said levers being in contact with said dish-shaped means, and connecting means pivotally connecting the other arm of said each of said double-armed means with said other clutch disk means.

8. A double clutch structure for agricultural tractors, comprising:

two clutch friction disk means provided with pressure plate means and arranged axially similarly with respect to each other, one of said friction disk means being adapted to be connected with the transmission input shaft and the other with an auxiliary drive shaft, common pressure spring means normally holding said friction disk means in engagement, disengaging means for disengaging the disk means including circumferentially distributed disengaging lever means and disengaging bearing means having roller bearing means operable to engage with said lever means, said disengaging bearing means being displaceably supported independently of one another relative to said clutch disk means, the disengaging bearing means coordinated to said other clutch disk means including an outer ring and an inner ring and substantially dish-shaped means held by said outer ring and provided with conical pressure surface means for the corresponding disengaging lever means and with a substantially cylindrically shaped annular centering surface means against which said disengaging lever means come to lie after the lifting of said other clutch disk means, said dish-shaped means being additionally provided with a further substantially cylindrically shaped annular surface means, and said conical pressure surface means being arranged between said first-named surface means and said further substantially cylindrically shaped annular surface means, one of said annular surface means serving as centering surface and the other as end abutment for said last-mentioned disengaging lever means, a centering sleeve, said last-mentioned disengaging bearing means including a housing displaceably supported on said centering sleeve, said dish-shaped means being surrounded over a portion of the circumference thereof by said housing, and said housing being provided with a hub portion supporting the inner ring of said last-mentioned disengaging bearing means, an adjusting shaft, said centering sleeve serving for the guidance and support of said adjusting shaft and said adjusting shaft supporting thereon the disengaging bearing means of the clutch disk means associated with the transmission input shaft, said disengaging lever means being formed by double-armed bell-cranks, one of the angularly bent arms of each of a plurality of said bell-cranks being in contact with said dish-shaped means, and connecting means including a pull-rod pivotally connecting the other arm of the bell-crank with the pressure plate means of said other clutch disk means.

9. A double clutch structure for agricultural tractors, comprising:

two clutch disk means, one of said clutch disk means being adapted to be connected with a first shaft and the other with a second shaft, common pressure spring means normally holding said clutch disk means in engagement, disengaging means for disengaging the clutch disk means including disengaging lever means and disengaging bearing means operable to engage with said lever means, said disengaging bearing means being displaceably supported independently of one another relative to said clutch disk means, the disengaging bearing means coordinated to said other clutch disk means including ring means and substantially dish-shaped means held by said ring means and provided with approximately conical pressure surface means for the corresponding disengaging lever means and with annular surface means against which said disengaging lever means come to lie after lifting of said other clutch disk means, sleeve means, said last-mentioned disengaging bearing means including housing means displaceably supported on said sleeve means, said dish-shaped means being surrounded over a portion of the circumference thereof by said housing means and said housing means being provided with a hub portion supporting some of the ring means of said disengaging bearing means, further shaft means, said sleeve means serving for the guidance and support of said further shaft means and said further shaft means supporting thereon the disengaging bearing means of the clutch disk means associated with the first shaft.

References Cited by the Examiner

UNITED STATES PATENTS

| | | | |
|---|---|---|---|
| 1,985,423 | 12/34 | Pearmain | 192—68 |
| 2,402,897 | 6/46 | Kindig et al. | 192—68 |
| 2,436,817 | 3/48 | Miller | 192—99 X |
| 2,854,110 | 9/58 | Senkowski et al. | 192—48 |

FOREIGN PATENTS 887,589  8/53  Germany.

DON A. WAITE, *Primary Examiner.*

DAVID J. WILLIAMOWSKY, *Examiner.*